April 21, 1970     S. CIRAMI     3,507,222
ROBOT RIDE Filed March 15, 1967     7 Sheets-Sheet 1 fig.1

INVENTOR
Salvatore Cirami

April 21, 1970     S. CIRAMI     3,507,222
ROBOT RIDE Filed March 15, 1967     7 Sheets-Sheet 2 fig. 3 fig. 2 fig.5 fig.9

April 21, 1970     S. CIRAMI     3,507,222

ROBOT RIDE

Filed March 15, 1967     7 Sheets-Sheet 6 fig. 7

United States Patent Office 3,507,222
Patented Apr. 21, 1970

3,507,222
ROBOT RIDE
Salvatore Cirami, 41—13 Vernon Blvd.,
Long Island City, N.Y. 11101
Filed Mar. 15, 1967, Ser. No. 623,371
Int. Cl. A23g 21/04
U.S. Cl. 104—53                                        8 Claims

ABSTRACT OF THE DISCLOSURE

This invention relates to improvements in an amusement roundabout consisting of a plurality of passenger carrying vehicles having the form of robots, each carrying independent propulsion means including stepping foot members, and in which the robot simulating vehicles are secured to and guided by trackway means arranged in a closed loop whereby the vehicles repeatedly traverse a predetermined course.

More particularly, the present invention relates to improvements in the design of the trackway means whereby the vehicles travel on top of instead of alongside of the trackway; an improvement in the means by which the passenger compartment is caused to rock from side to side as the vehicles advance; the provision of means for insuring that when the ride is stopped all the robots will come to rest with the passenger compartment in a level position.

---

This invention relates to amusement rides and more particularly to an amusement ride of the roundabout type.

There have been issued to me several patents in which is disclosed an amusement ride consisting of a passenger carrying vehicle having the form of a walking figure, specifically that of a robot, which is guided and paritally supported by a trackway. The patents referred to are: Robot Amusement Ride, No. 3,093,372; Walking Roundabout, No. 3,085,516; Trackway and Yoke Arrangement, No. 3,120,197; and a patent on another type of walking ride showing certain improvements applicable to Robot Ride: Walking-Figure Amusement Land Vehicle, No. 3,134,453. As a matter of interest, the patent position also includes: Coin Operated Robot Ride, No. 3,137,501; One-Piece Vehicle Body, No. 3,023,045; and a design patent: Robot Amusement Ride Device, No. 194,613. All of these are United States patents.

The present disclosure introduces a number of improvements in the invention described in those patents.

According to the original concept the trackway is in a form having general resemblance to a fence or a guard rail, in that the main element is a laterally disposed pipe about a foot off the ground, that is arranged in a zig-zagging closed loop that is supported by a number of spaced apart posts which are themselves implanted in or otherwise permanently fixed to the ground. A plurality of robots, operating independently of each other and each having its own motor-driven walking mechanism for self-propulsion, are positioned standing directly on the ground immediately alongside the trackway. Each robot is provided with a coupling device that connects the robot to the pipe is in such a manner that the robot is confined to walking only alongside the trackway.

In short then, the trackway and coupling device provide guidance and prevent the robot from toppling, and the robot's walking mechanism provides only the propulsion, through the medium of stepping foot members which gain traction on the ground. The remainder of each robot's body is merely a passenger seating compartment that rides on the walking mechanism.

The arrangement just described has certain limitations which have now been overcome through the substantially different concept that is the subject of the present disclosure.

A prime object of the present invention is to provide a trackway in the form of a plurality of interchangeable porable sections, each in the form of a raised longitudinally divided platform or runway that is closed at the outboard sides, and having guide rails concealed under the runway, the guide rails being spaced apart on either side of and paralleling the longitudinal division or slot in the runway; the runway providing a mud-free, ideally surfaced course on which the robots walk. In other words, I am substituting controlled, predetermined conditions for the uncertainty of the former arrangement.

Another object of the present disclosure is to provide, in substitution for the coupling device of the earlier concept, a railway truck adapted to roll in confined engagement with the guide rails under the runway, the rails and wheels being so constructed and arranged that the truck cannot be accidentally disengaged from the rails. A part of this object is to provide the railway truck with an upright post that is supported at its lower end by the truck and the free upper end of which post extends through the longitudinal division in the runway. Another part of this object is to provide a certain amount of elevational movement of the post, attained by the specific way in which the post is secured to the truck.

By way of explanation, a separate railway truck is provided for each robot, the robot being clamped to the upper end of the post carried by the truck, the post passing between the robot's feet. The railway truck and divided runway plus guide rails combination provides basic support for the robot so that it is impossible for it to topple; provides guidance as determined by the layout of the trackway; and provides sufficient concealment of the mechanical devices used to achieve these functions that to the onlooker, each robot appears to be walking along unaided by external support means.

Another object is to provide a counterbalance feature that drives the post upward with a force sufficient to almost completely offset the weight of the robot clamped on the upper end of the post. The object sought is that of greatly reducing the effective weight of the robot so that a less expensive, smaller size motor can be used in the robot's walking mechanism.

A further object is to provide a counterbalance feature that is automatic, such that even the weight added by passengers is automatically compensated for by increased tension of a powerful spring, the pull of which tends to force the post, and therefore the robot, upward. The object is to provide a vehicle that is as light as possible, even when under maximum load: to achieve a bouncing action and impart a resiliency to the stepping movement.

Returning to the trackway itself, another object is to construct the trackway in such manner that without disconnecting end-wise joined sections, a given section of trackway can be opened up for access to internal elements, installing or removing a railway truck, or general maintenance.

Another object is to provide an automatic stop or "auto-stop" feature which, when a switch is opened to make the robots stop, causes each robot to continue receiving power until both its foot members are in contact with the runway; i.e., the object is to overcome the possibility of the robot's stopping in a one-foot-up one-foot-down position. The auto-stop feature enables each robot to disregard a "stop" command until it is in the proper position.

Another object is to pivotally connect the robot's passenger compartment to its walking mechanism, and provide drive means connected to the compartment and synchronized with the walking mechanism such that as the robot advances, its body portion only bends from side to side to heighten the illusion of life-like activity, and impart an additional displacement to the passengers.

Another object is to provide further improvements in the robot's foot member, presenting greater simplicity of construction for lowest cost, stronger yet lighter weight construction, incorporate a simplified suspension system, and include a replaceable sponge rubber sole to quiet the stepping action and generally extend the life of the foot member and the walking mechanism.

Another object is to provide the railway truck with a novel, especially low cost wheel assembly the reliability of which is foolproof and which can follow extremely tight turns in the guide rails.

Many other improvements have been made. For example, the styling has been modified to provide a first glance appearance at least as attractive as the unit shown in the design patent cited, but which actually has twice the passenger capacity.

The body styling has been further modified to provide greater operating clearance for the feet, thereby enabling the crankshaft of the walking mechanism to be of greater throw, so that the robot can move faster by taking longer steps than was previously possible.

And finally, the construction of the walking mechanism has been simplified and made extremely rugged. Almost all its parts are readily available as stock items, and the remaining parts are of the simplest, even crude design for lowest labor cost at the time of manufacture.

Other objects and capabilities will appear as the description progresses, reference being had to the accompanying drawings, in which—

Figure 1:
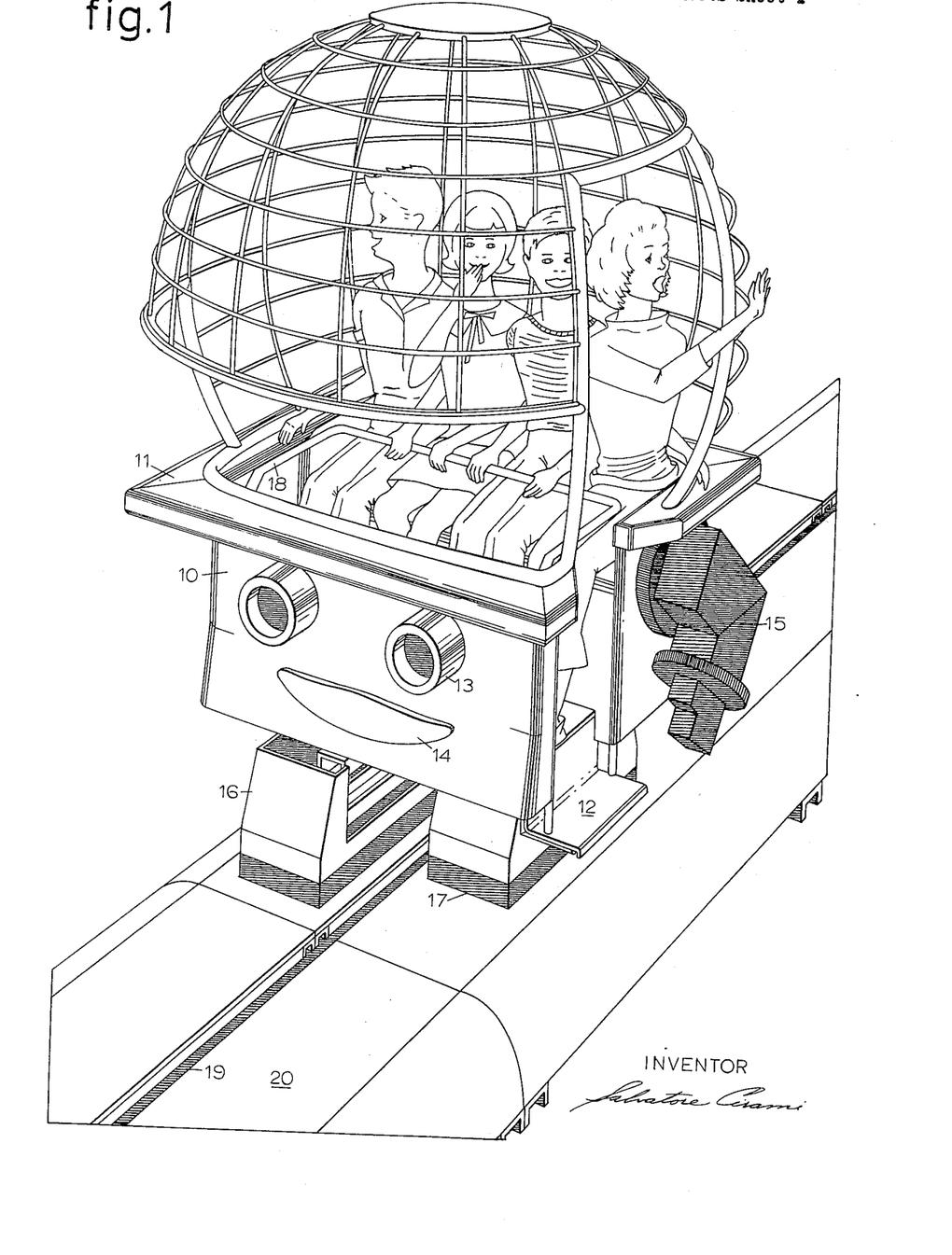
FIG. 1 is a general view in perspective of a single robot vehicle standing on a straight portion of portable trackway; it being understood that in practice the trackway is actually continued fore and aft and joined to form a closed course comprising an interesting combination of straight and curved sections.

Referring now more particularly to FIG. 1, the robot's passenger seating compartment 10 is constructed of sheet aluminum riveted to a tubular steel framework. The seating compartment, representing the torso of the robot includes a wide shoulder 11 that carries a tubing reinforced wire cage that suggests the robot's head. The proportions of the robot are such that it can carry as many as four children at a time, as shown; but the ride has a family appeal and will seat various combinations of children and adults. The construction therefore combines maximum strength for dependable, rugged performance with simplicity of design for lowest cost of production. Note the extensions of the tubular steel frame that support the step 12. The step and the floor of the compartment are, preferably, of tread plate.

Decorative lamps 13 simulate eyes, an aluminum sheet covered plywood board 14 the edges of which are painted aluminum color, simulates a mouth; and the arms, one of which is shown at 15 are made entirely of plywood, painted black and simply bolted to the rigid framework through the sheet metal.

The robot's feet are essentially thin gauge aluminum boxes 16 that stand on thick sponge rubber pads 17.

As with most amusement cars the passenger compartment is provided with a lap type safety bar 18 that swings up out of the way to let the passengers off.

While it is true that the robot is standing on its feet, the feet provide only traction for purposes of propulsion, the actual support is provided by a post that stands between the robot's feet. The upper end of the post is fixed to the basic support structure of the walking mechanism and the lower end of the post extends downwardly through the slot or division 19 in the runway 20 and is in turn carried by the concealed railway truck. An important feature of the ride is that the post is not ordinarily noticeable, thereby creating the illusion of independent, self-sustaining action, without compromising maximum safety, at the same time providing an extremely simple means for guiding the robot in a sure, positive way.

Figure 2:
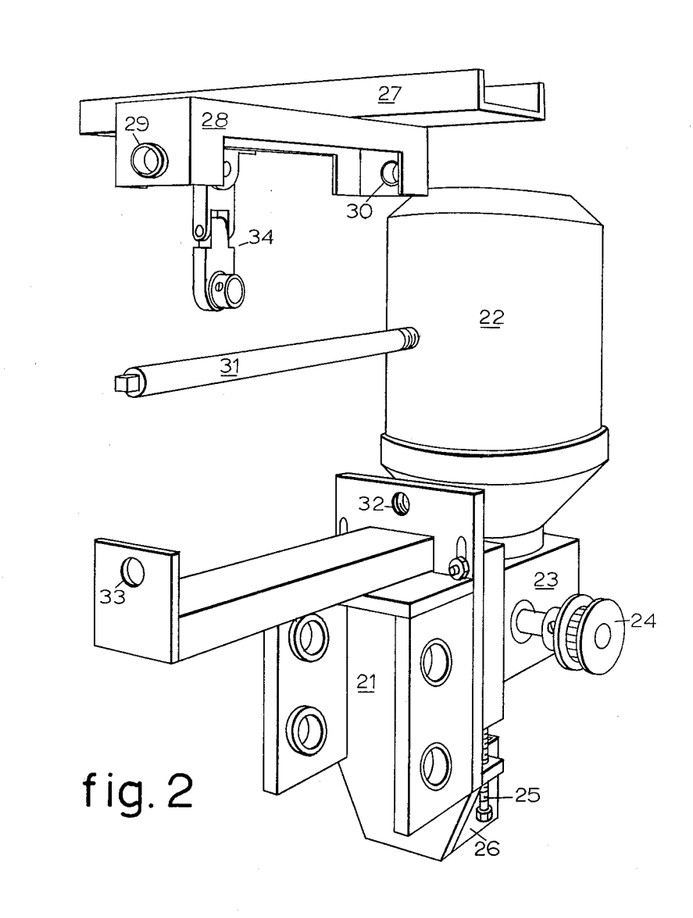
FIG. 2 is an exploded perspective view of the basic support structure of the walking mechanism together with some of the elements comprising the walking mechanism, support means and drive elements for the passenger compartment.

The walking mechanism consists of a basic support structure 21, FIG. 2 made of rigid steel plates welded together. To the rear of the structure 21 is bolted a vertically mounted stock ratiomotor; the number 22 indicating the motor, which is face mounted on the worm gear reductor unit 23 out of which emerges the drive shaft which is shown already equipped with the pulley wheel 24.

The lower part of the support structure 21, underneath the reductor 23 provides means for sliding the ratiomotor up or down by turning bolts as at 25; and further provides means 26 for receiving and securing the upper end of the post earlier referred to as being carried by the railway truck for the purpose of supporting the robot.

The robot's passenger seating compartment is hinged to the basic support structure 21. This is accomplished by securing to the framework on the underside of the floor of the passenger compartment a cross member 27 welded to a longitudinal member 28 which is bored and provided with bushings 29, 30 that, when the device is assembled, rest upon and rotate a few degrees around the shaft 31. The shaft 31 is provided with threads at its rearward end that are turned into the threaded opening 32; the forward end of the shaft being journaled in the smooth opening 33.

To the cross member 27 is bolted a universal type coupling device 34. Looking at FIG. 3, in which some of the elements shown in FIG. 2 have been removed for clarity of presentation, you can see that the coupling device 34 is, at its lower end secured to the offset shaft of an auxiliary crankshaft 35.

Figure 3:
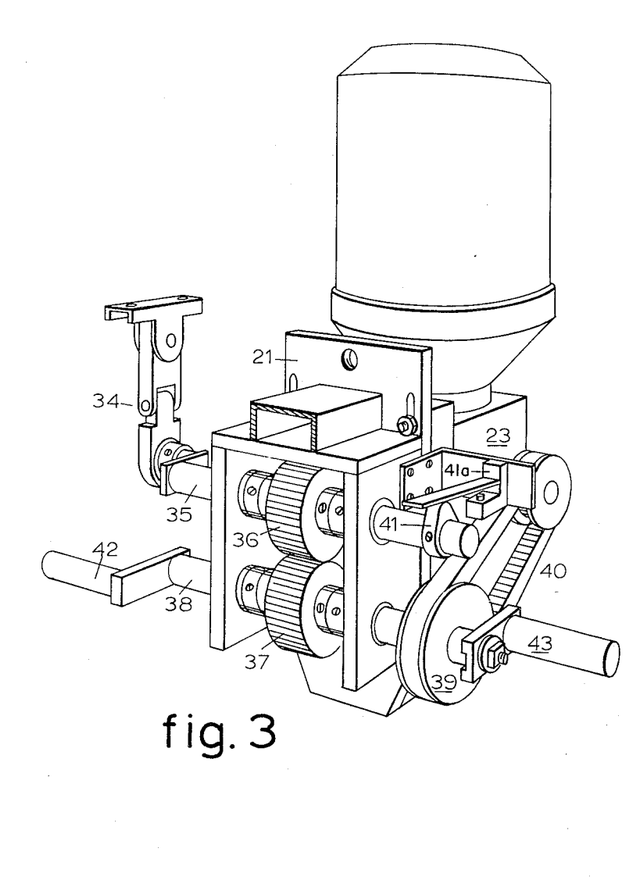
FIG. 3 is a sectioned perspective view generally similar to FIG. 2, showing a more advanced assembly of the walking mechanism.

The passenger compartment is forced to lean from side to side as a result of the rotation of auxiliary crankshaft 35.

The auxiliary crankshaft is itself driven through the spur gears 36, 37, by the main crankshaft 38. The gears are keyed in place on the crankshafts, and held properly centered in the basic support structure 21 by means of locking collars that butt against thrust bushings in the walls of the support structure 21. Since the two crankshafts are geared together, the up-down movement of the coupling device 34 is synchronized with the rotational movement of the main crankshaft.

The main crankshaft is provided with a pulley wheel 39 and timing belt drive 40 enabling the whole system to be powered by the ratiomotor.

The two crankshafts are so synchronized that the passenger compartment leans toward the side of the lowering foot member; i.e., the passenger compartment leans in such a manner that its center of gravity shifts toward the foot member that is assuming the load. As a result the robot's walking action is inherently balanced at all times. This is quite an improvement over previous designs. As a bonus, the excitement of the ride is greatly enhanced, and the illusion is much more natural and lifelike.

Since the reductor 23 is a worm gear device, and power transmission is by means of a timing belt, there is no slippage in the drive system; i.e., we can bring the crankshafts to rest in any given position merely by shutting off the power at just the right moment.

It is in fact desirable to stop the crankshafts in a given position to insure that the passenger compartment will always come to rest in a level attitude. Further, we want the robot to stop only when both its feet are flat on the runway: so that the floor of the passenger compartment will not be at an unnecessarily high elevation.

These objects are accomplished in a very simple way. A cam 41, FIG. 3 is secured to the opposite free end of the auxiliary crankshaft 35, and a microswitch 41A—in the motor's power circuit—is located adjacent the cam, in such position that one end of a movable arm carried by the microswitch rests upon the cam and is moved up and down by the cam as the crankshaft 35 revolves. Taking into account the momentum of the motor if any (it may be a braking motor) the exact angular position of the cam is so adjusted that the microswitch is opened at just the right moment that when the motor has come to a stop the crankshafts are in the desired position.

As is no doubt obvious, the walking mechanism is ideally suited to the requirements of an amusement ride application. The arrangement bears a certain analogy to a bicycle pedal assembly. Separated from the passenger compartment control system, the walking mechanism itself it basically only a ratiomotor driving a crankshaft on the ends of which are balanced hollow boxes. In other words, the right and left foot members are secured in pivotal balanced dependence on the offset shafts 42, 43 respectively of the main crankshaft 38.

Figure 4:
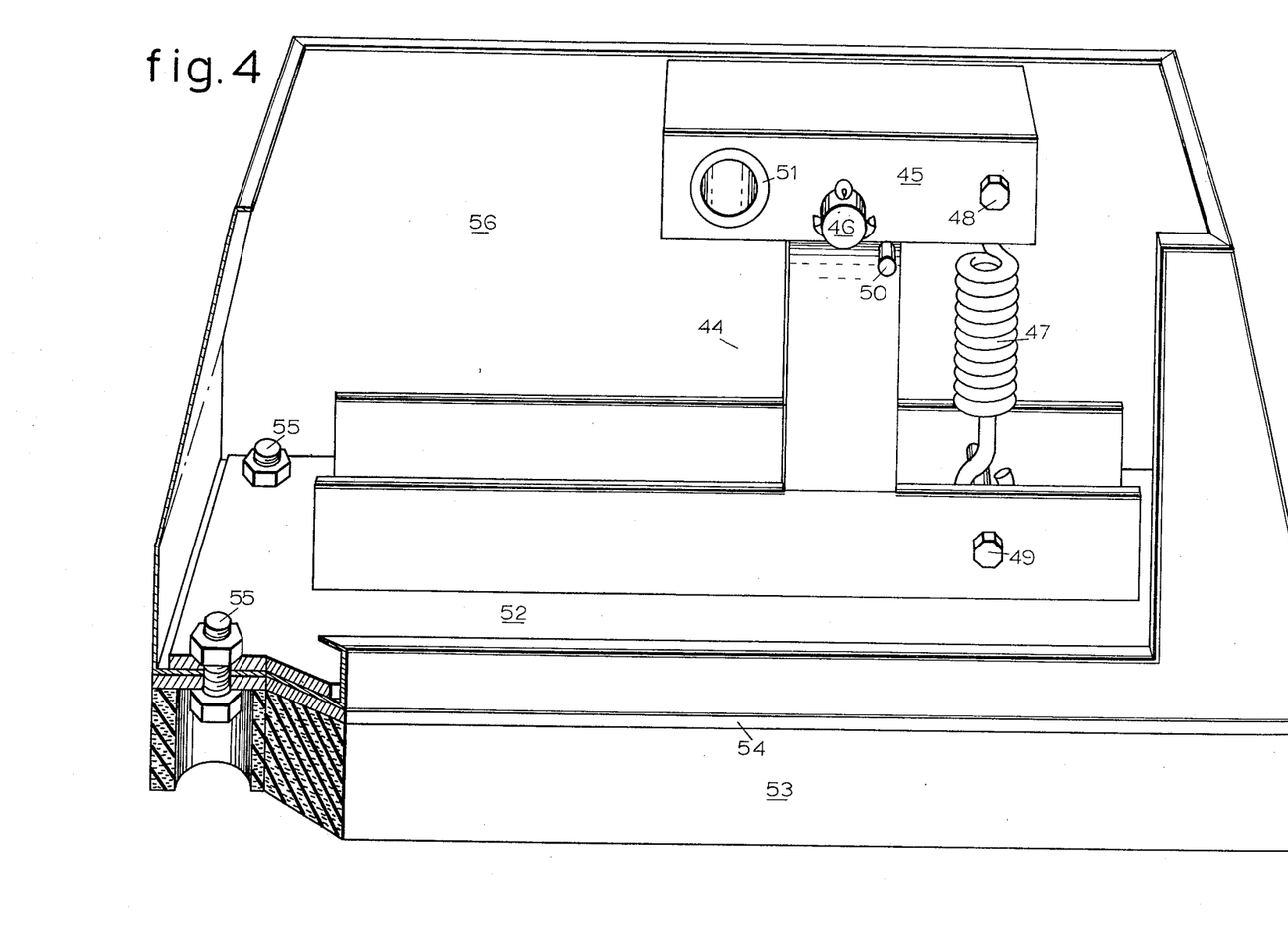
FIG. 4 is a partly sectioned perspective view of a right foot member, drawn to a much larger scale than the drawings of the remainder of the walking mechanism, FIGS. 2, 3.

One of these foot members is shown enlarged in FIG. 4. It consists merely of standard U-shaped channel steel members welded together to provide a support, indicated generally as 44, to the upper end of which is pivotally connected another length of U channel 45, by means of the shaft 46. A spring 47, tensioned between bolts 48, 49 tends to pull the right hand end (actually the rearward end of the foot member) of the member downwardly, but the member remains in a level position because of the rigid pin 50 that is fixed to the upright element of the structure 44.

The prime purpose of the member 45 is to carry the sleeve bushing 51, which extends between and is secured in the opposite walls of the U channel member 45.

The figure represents the robot's right foot; and in the assembled position, the offset shaft 42, FIG. 3 is journaled in the bushing 51 and is secured in same by means of a locking collar or a washer and cotter pin.

The foot member is so planned that the foot will hang in balanced dependence from the shaft 42. In other words, even when the foot member is lifted clear of the runway, the foot member either tends to remain level, or it may be allowed to list rearwardly somewhat: to insure that the foot member can not roll over itself when lowered. However, working models have shown that the latter precaution is really unnecessary since there will not be any rocks on the improved smooth trackway.

The function of the spring 47 is to provide the walking mechanism with an economical and thoroughly practical shock absorbing system. When the offset shaft 42 drives the foot member downward until it strikes the runway, the greatest part of whatever shock there may be is absorbed by the spring 47: because the member 45 rotates slightly; the bushing 51 lowering and increasing tension on the spring momentarily.

An additional function of the spring is to smooth the up-down movement of the robot as a whole; i.e., avoid a jerking movement. This is attained because not all of the energy of the walking mechanism is applied to lifting the vehicle over a rock-solid foot member. Instead, the foot member yields a little so that the rotating main crankshaft does not have to lift the vehicle quite so high.

The structure 44 is welded to a steel plate 52 that closely approximates the size and shape of the floor of the foot member. The function of the plate 52 is to spread the load borne by the structure 44 over the entire floor area occupied by the foot member.

An additional shock absorbing and especially a sound deadening feature is provided by the extra thick sponge rubber pad 53 that is cemented with epoxy resin to an aluminum plate 54. A plywood board, if thick enough, is also suitable to further reduce cost. The rubber pad plus reinforcing plate combination is a replaceable item that can be readily discarded when the rubber has become worn, being connected to the plate 52 by means of four bolts 55, two of which are shown at the forward end of the foot member.

Sandwiched between the plates 52 and 54 is a lightweight box-like enclosure 56 made of relatively thin-walled sheet aluminum, which has the decorative function of concealing the mechanical elements of the foot member and in fact, creating the illusion by virtue of its shape that the entire structure is indeed a foot member. Should the enclosure 56 become dented in the course of long usage, it too is replaceable simply by removing the bolts 55 and installing a new enclosure in place of the old.

Figure 5:
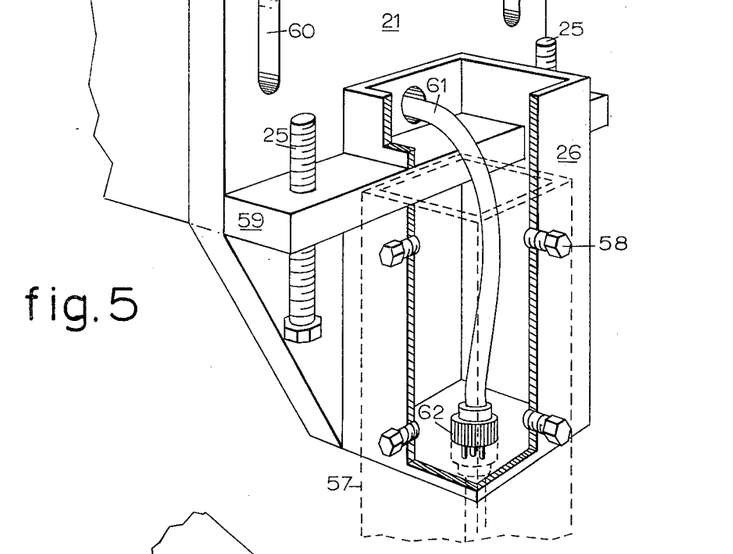
FIG. 5 is an enlarged, partly sectioned perspective view of the clamp means forming an integral part of the basic support structure of the walking mechanism and which is used to fasten the robot onto the upper free end of the post carried by the railway truck.

Before leaving the walking mechanism, we might take a closer look, in FIG. 5, at the means whereby the walking mechanism is secured to the railway truck which provides support for the robot.

Figure 7:
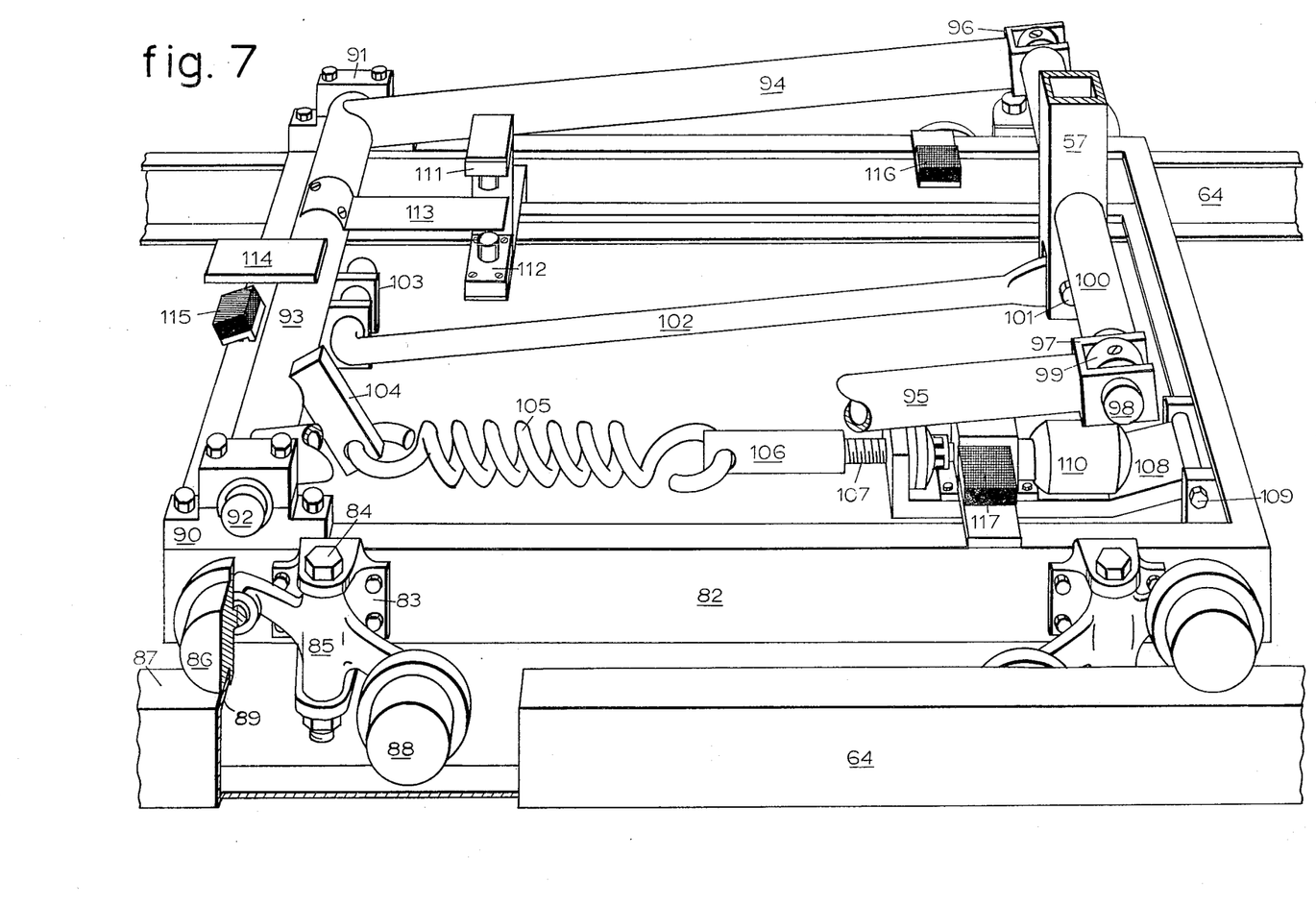
FIG. 7 is a partly sectioned perspective view of a railway truck.

An essential feature of the railway truck, which is shown in FIG. 7, is an upright post 57 that is square when seen in cross section. This post is seen in FIG. 5 in phantom view as indicated by the dashed lines, and it is hollow. The basic support structure 21 of the walking mechanism is provided with a square shaped member 26 welded to the rear of the structure 21 and which receives the post 57; the post being locked in place by means of the four machine screws 58 located on two sides of the member 26.

To the rear of structure 21 is also welded a bar 59 through which are threaded the large machine screws 25 used for pushing against the reductor base for adjusting the tension of the timing belt; the structure 21 having been provided with elongated bolt holes 60 to permit movement of the ratiomotor.

The bar 59 passes through the member 26, thereby providing a positive stop means preventing further vertical travel of the post 57.

Power for the walking mechanism's motor is supplied by means of the power cord 61 which is provided with the male side of a disconnect plug 62. The female side of the plug together with its flexible power cord is located inside the hollow post and leads through same to a power pickup means located on the railway truck. The upper and lower ends of the plug are of course connected together just before settling the member 26 onto the post; the upper and lower portions of the power cord being flexible to facilitate same.

Figure 6:
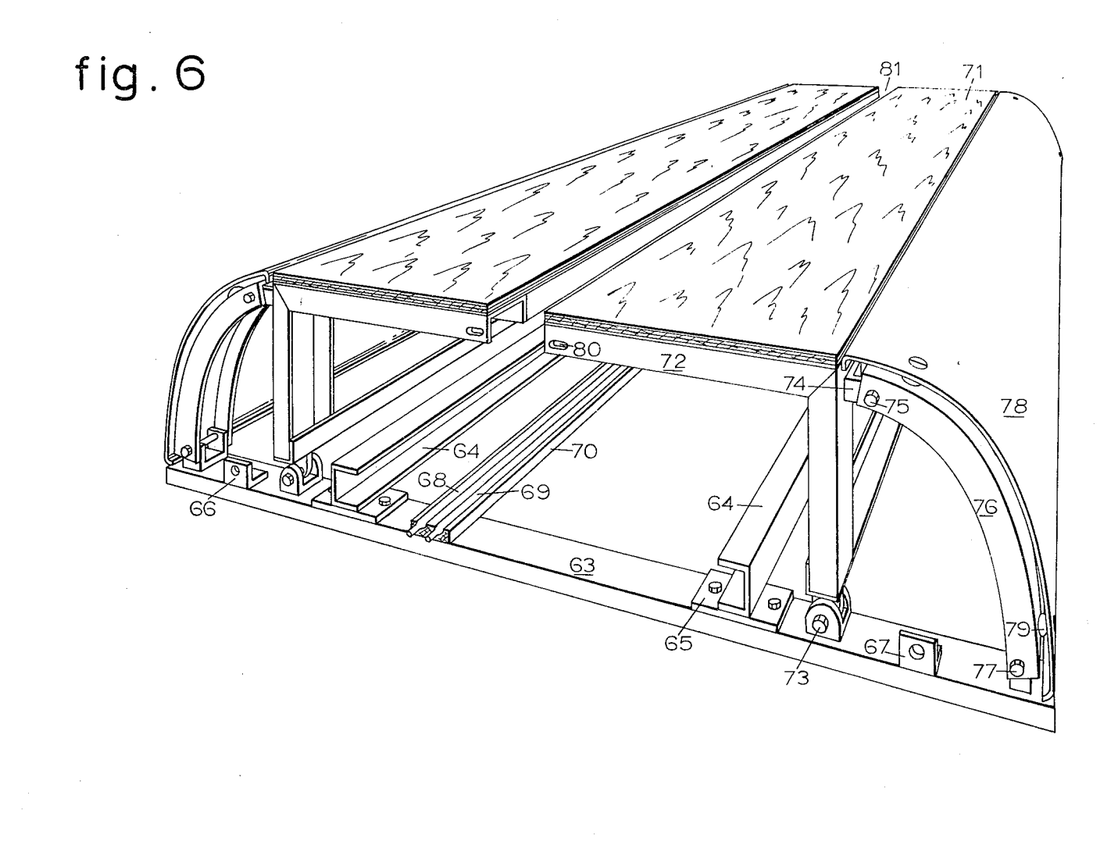
FIG. 6 is a general perspective view of a straight section of portable trackway.

Turning now to FIG. 6, each section of trackway comprises cross members of "U" channel steel, at least one at each end of the section, one of which cross members is shown in this view, indicated by the numeral 63.

Two spaced apart parallel guide rails 64 rest upon and rigidly connect together the cross members, the rails being welded to relatively wide cross plates 65 which are bolted to the cross members. Elongated holes are provided in the cross members to allow for minor adjustment of the rails prior to final tightening of the bolts so that the rails can be aligned perfectly parallel.

The sections are bolted together by means of the angle irons 66, 67 which are welded to the end-located cross members.

In use, one of the guide rails serves as the "ground side" of the electrical circuit that powers the ride. Current to operate the ride is carried by two separate conductors 68, 69 electrically isolated by means of the insulating board 70 that is bolted to the cross members. In this embodiment the conductors are in the form of aluminum tubing, narrowed at one end only, so that a length of tubing in one section of trackway can be pushed into the corresponding length of tubing in the next section of trackway to form a continuous conductor of indefinite length. The method provides positive electrical connections quickly, without the use of bolts or screws.

Overhanging the railway is a divided runway, each half of which comprises a sheet of ¾" exterior plywood 71 fixed to and supported by an L-shaped rigid steel framework 72 that extends between and is pivotally connected at its base by means of a bolt 73 to each of the cross members.

The framework includes U-shaped brackets, as at 74 welded at an elevation and bore to receive a readily removable bolt 75 that secures to the framework the upper end of a curved arm 76. The lower end of the arm is bolted, at 77, to the cross member. The framework 72 is provided with another arm like 76 at each cross member along the length of the trackway section. As is no doubt obvious, the arms serve to steady the framework and keep the runway level. By the same token, you can see that it is quite easy to get inside the trackway for maintenance. Merely by removing one of the bolts 75 or 77 the framework 72 will swing open, pivoting around the bolt 73 and its counterparts at each cross member station.

To provide a streamlined appearance, the curved arms are used to support a lightweight resilient fiberglass panel 78 that is connected to the arms by means of quick-disconnect fasteners such as are used in the aircraft industry. For maximum resistance to abuse the panels are spaced apart from the arms by means of large rubber grommets 79.

To insure perfect alignment of the runways of successive sections of trackway, the framework 72 is provided with an elongated hole 80 at each of its free ends through which a bolt is inserted. Before opening up a section of trackway, it is of course necessary to remove these bolts.

The separate frameworks are spaced apart sufficiently to leave the slot or division 81.

The trackway is provided in a variety of standard straight and curved sections as is the case with many other amusement railways. But, something which is not the case with any other amusement railway is the fact that a ride purchaser on a small budget can start with a low cost circular Robot Ride layout and, even though the circle is of small radius he can operate enough robots to make the operation successful. Then, if and when he sees fit, he can grow to a larger operation without any loss of his original investment merely by converting to a zig-zagging layout by adding more trackway and robots.

No other tracked ride has been able to offer this feature, simply because they all use wheeled vehicles. On a small circular layout using an independent wheeled car it would go around so fast that you could only use one car, making this ride commercially impractical.

The robots on the other hand, have a relatively slower, deliberate, precisely controllable movement that enables a closer spacing to be maintained, thereby allowing a number of them to be operated on a small circular layout. Here, as well as on the larger ride, one section of trackway should be wired independently so that power to it can be cut momentarily to provide a manual means for controlling the spacing between robots.

The trackway cooperates with the railway truck, FIG. 7. In this figure, a portion of the guide rails 64 of FIG. 6 are redrawn, see FIG. 7, to show the way in which the railway truck engages the guide rails.

Another element of the railway truck previously labeled is the post 57. It is necessary to keep in mind the fact that the post is here shown greatly shortened, merely to fit the view on the sheet. Actually, the post 57, FIG. 7 is four or five times as tall as is shown; tall enough to extend through the slot 81, FIG. 6 and reach up into the robot's walking mechanism where it is clamped into the member 26, FIG. 5 by means of the screws 58.

But to take first things first, the truck comprises an extremely lightweight but very rigid hard aluminum frame 82 that is provided at each corner with a wheel assembly consisting of a rigid cast aluminum C bracket 83 in which is pivotally mounted, by means of the long bolt 84, a rigid cast aluminum double-armed support 85 carrying one wheel 86 in engagement on the upper surface 87 of the guide rail, and another wheel 88 spaced just below the surface 89 of the guide rail. The wheels are flanged and the arrangement is such that the flanges, in effect, overlap. That is, both are more or less in contact with the inner edge of the guide rail.

I should point out here that only the upper laterally extending side of the guide rail functions as a track, the lower side merely reinforces the upright wall of the guide rail. But to return to our consideration of the wheels: the upper wheel 86 provides basic rolling support for the truck; the lower wheel 88 prevents the truck from being lifted off the guide rail, and the flange on both wheels prevents sidewise movement of the truck against the guide rail; i.e., the flanges keep the truck properly positioned between the rails.

At first glance it would seem costly to provide eight wheels for each truck. Actually it turns out to be quite economical because smaller wheels can be used because there are more of them to carry the load. It happens that wheel assemblies of useful size and well within the load carrying capacity required are available as a mass-produced stock item. These prefabricated assemblies come equipped with a ball-bearing mounted axle that is threaded at one end for mounting on a support such as is shown in FIG. 7, and they even include a built-in lubrication system.

The wheel arrangement provides at unusually low cost a thoroughly reliable means for confining the truck and for enabling the truck to follow turns of very short radius.

At its forward end, the truck is provided with standard split type pillow blocks 90, 91 that support a shaft 92 that passes through a cross pipe 93 to which are welded longitudinal pipes 94, 95 the free ends of which carry U-shaped elements 96, 97 through which is journaled the shaft 98, which is secured in place by means of set-screws in locking collars as at 99.

To the post 57 is welded a pipe 100 through which the shaft 98 passes. The lowermost end of the post is notched and provided with a bolt 101 that secures one end of a guide rod 102, the other end of the rod being journaled through rigid members 103 that are fixed to the box frame 82.

The assembly is so arranged as to effect a parallelogram; and preferably, its construction should employ lightweight high strength steel pipes. Any rotational movement of cross pipe 93 is converted into a vertical movement of the post 57. Since the robot is secured on the uppermost end of the post, if a force is applied to the cross pipe tending to rotate it in the proper direction, the effect will be to counteract or counterbalance the weight of the robot.

We accomplish just that by fixing lever 104 to the cross pipe and attaching to it one end of a powerful pull-type spring 105. The other end of the spring is secured to a steel sleeve 106 that is internally threaded to receive a threaded rod 107 the right-hand end of which has a smooth shaft that is rotatably mounted in thrust bearings that are carried by a base 108 that is pivotally connected at 109 to elements protruding from the box frame.

The tension of the spring can be adjusted manually by turning the threaded rod until the weight of the empty robot is neutralized. For that matter the threaded rod system can be eliminated and the spring hooked directly to the frame at the far right end; the spring having been carefully selected for just the right tension.

But I prefer to go one step further and include an electrically controlled motor operated counterbalance system that automatically compensates for the additional weight of the people the robot carries.

This is achieved by providing a light duty ratiomotor 110 to drive the threaded rod. The motor is instantly reversible as a function of the pushbutton type microswitches 111 and 112 which are actuated by the flexible strip of steel 113 that is fastened to the cross pipe 93. When the robot is standing with both feet on the runway, if the robot is excessively heavy it will tend to sink into its feed because of the spring 47, FIG. 4 located in each foot member. This pushes the post 57, FIG. 7 downward, thereby rotating the cross pipe 93 clockwise and causing the flexible strip 113 to depress the pushbutton of microswitch 112, which sets up electrical connections with ratiomotor 110 in such a way that the effect of the direction in which the motor rotates is such as to increase the tension of the spring 105.

As the robot walks along, the free end of the flexible strip 113 is constantly moving up and down.

As the robot becomes lighter due to the operation of the ratiomotor as just described, the flexible strip will cease to make contact with the microswitch 112 because the robot is now tending to ride higher on its feet: because the springs in the feet are now better able to lift the robot.

Should the robot become too light, the flexible strip 113 will contact microswitch 111 which operates ratiomotor 110 in the reverse direction thereby decreasing the tension of spring 105 and allowing the springs in the robot's feet to carry more of the robot's weight.

If for any reason the automatic counterbalance system should fail, physical limits are provided. For example, if the robot should become so light as to float clear of the runway, the up-stop member 114 will strike the rubber pad 115 that is secured to the frame. Should the robot become inordinately heavy the longitudinal pipes 94, 95 will merely bottom against the rubber pads 116, 117.

To minimize the cost of the ride the motors should of course be A.C., but if the added cost of rectifying A.C. to D.C. can be borne, the action of the ride can be given variety by enabling the passengers to control the speed of the robot from a slow walk to a high bouncing trot.

Figure 8:
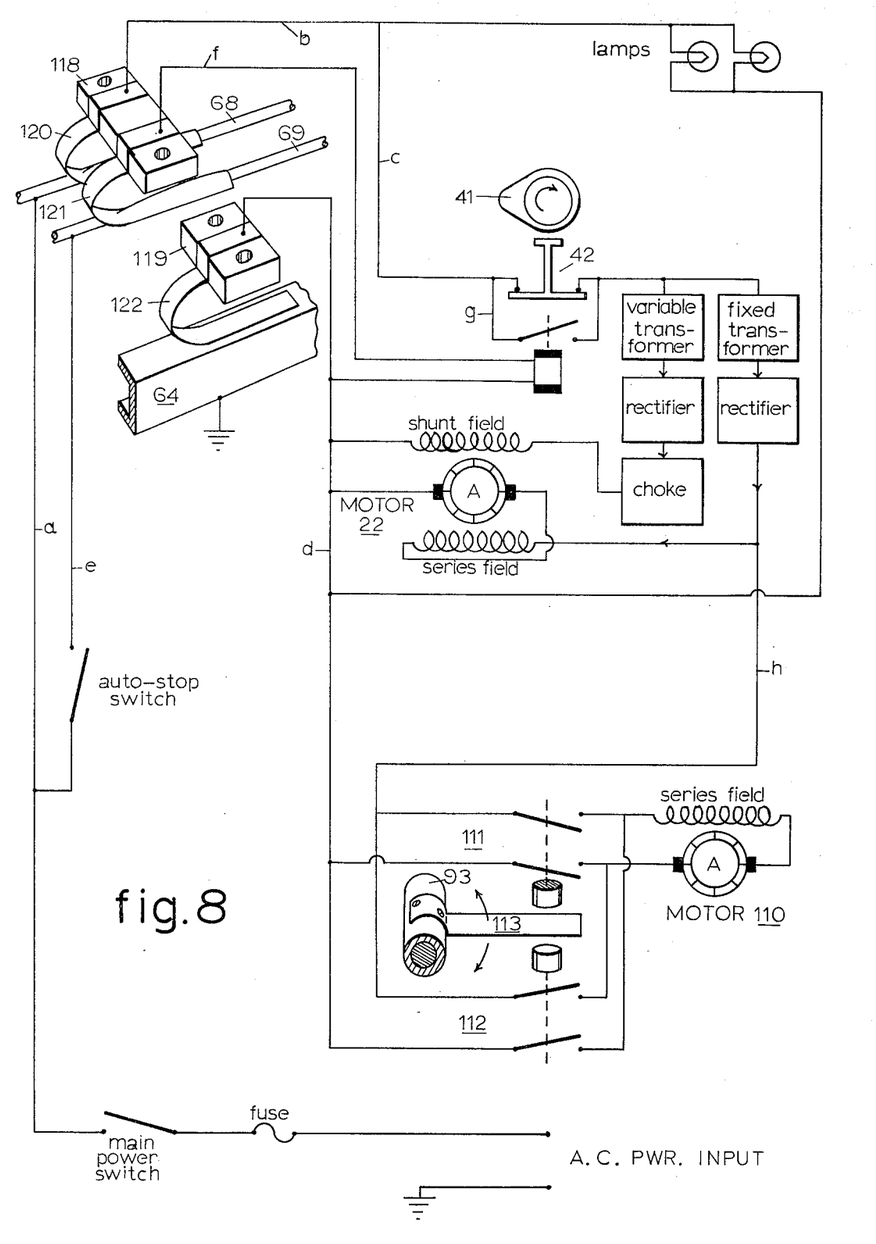
FIG. 8 is a schematic wiring diagram with pictorial elements, showing the way in which a robot obtains power from the trackway rails, how the auto-stop circuit is wired, and how the automatic counterbalance circuit is wired.

FIG. 8 shows schematically how this is done using a rectification device that is presently being manufactured as a stock item. In addition, certain other features of Robot Ride's electrical system will next be explained.

Alternating Current power is passed through a central control station on which the Main Power Switch and the Auto-Stop Switch shown in FIG. 8 is located. From this station power is carried to the tubular conductors 68, 69 in the trackway. A short segment of one of the guide rails 64 is also represented in FIG. 8, and this is electrically grounded as indicated.

Each railway truck is provided with sliding shoe type devices for picking up current from the supply tubes 68, 69 and returning it through the grounded guide rail 64. The pickup devices comprising insulating blocks 118, 119 to which are epoxied or otherwise secured resilient metal conductors 120, 121, 122 that expand against and are slid along the tubing or guide rail as the case may be by the railway truck.

FIG. 8 represents the circuitry in a single robot together with a single railway truck.

To start the ride the operator closes the Main Power Switch. This sends A.C. up wire $a$ and tubing 68 is now electrified. Conductor 120 picks up the current and carries it through wire $b$ to the robot's decorative lighting: this includes the two lamps representing the robot's eyes as well as any additional lighting used for general illumination of the robot. I am thinking of fluorescent lamps installed under the robot's shoulder 11, FIG. 1 to light up the torso and arms; and lamps secured to the underside of the floor of the passenger seating compartment to light up and focus attention on the stepping feet: the lamps will be swung back and forth because of the rocking action of the compartment, further adding to the illusion of life through motion. By lighting up the robots in this way, little additional lighting is needed for the ride and most of the lighting is concentrated on and is carried along by the robots.

The current also carried along wire $c$ through the closed contacts of microswitch 42. This is the microswitch that is located on the robot's walking mechanism, and which is continually opened and closed as the robot walks—by means of the rotating cam 41; you may wish to compare FIG. 8 with FIG. 3.

From microswitch 42 the A.C. power is fed to a rectification unit that is in fact small enough to fit under the seat of the robot's passenger compartment, physically adjacent the walking mechanism itself. As the block diagram indicates, the rectifier divides the current, sending a variable D.C. voltage to the shunt wound field of a compound wound D.C. motor (the walking mechanism's motor 22, FIG. 2) and feeds a fixed D.C. voltage to the series wound field.

The wiring then connects with the ground wire $d$ that leads to the conductor 122 physically located on the railway truck.

I have modified the stock rectifier unit so that physically the variable transformer is removed from the unit and is instead located in the passenger seating compartment.

Figure 9:
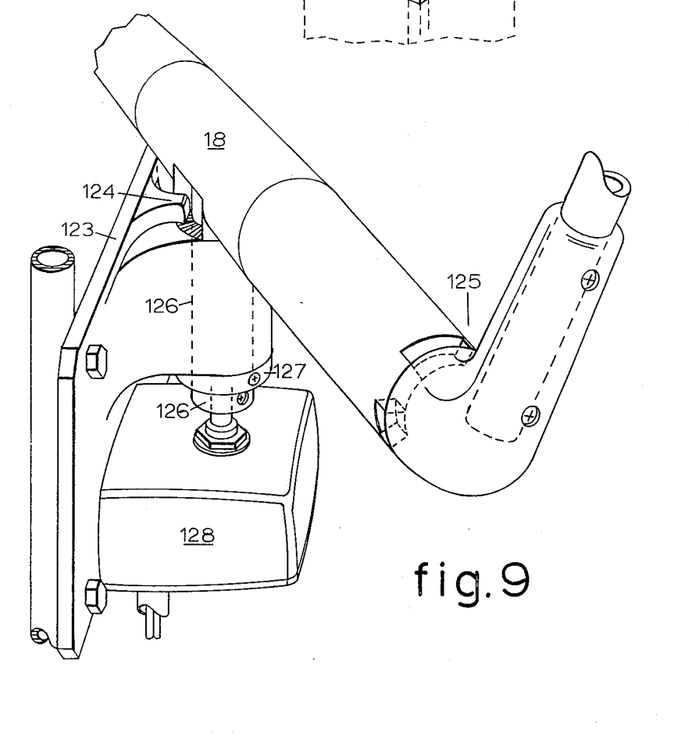
FIG. 9 is a fragmentary perspective view of the safety bar which the children are holding in FIG. 1, and especially of a variable transformer device which is connected to the bar and which is operated by movement of the bar.

FIG. 9 shows the actual physical arrangement. The drawing shows a portion of the safety bar 18, FIG. 9, FIG. 1 that the passengers hold when they are seated. The bar is pivotally secured to a supporting plate 123 that is bolted to the tubular steel frame of the robot's body. The bar can be moved left or right a few degrees as limited by the stop finger 124. The bar is also pivoted around a horizontal axis as at 125 so that the free end can be raised and lowered, and the design of the pivotal connection is such as to incorporate suitable stops for both the raised and optimum lowered position.

To the supported center of the bar 18 is fixed a vertical shaft 126. The bar is secured onto the support plate 123 by means of the locking collar 127 that encircles the shaft 126. The shaft extends below the collar and is bored axially and provided with a set screw for receipt of the rotatable shaft of the variable transformer 128.

The passengers cannot cause the robot to stop: only the operator can do that; but they can increase or decrease its speed by turning the safety bar to the left or right.

Let us return now to FIG. 8. At the start of the ride, the operator has closed not only the Main Power Switch but also the Auto-Stop Switch. This means that A.C. power is also going along wire $e$ to tubing 69, through conductor 121 and along wire $f$; thereby energizing the relay shown immediately below microswitch 42.

In other words, whenever the Auto-Stop Switch is in the closed position the jumper circuit $g$ short circuits microswitch 42. Therefore even though—as a result of the robot walking—the cam 41 is rotating and alternately opening and closing microswitch 42, power to the walking mechanism's motor continues uninterrupted.

When the operator wants to stop the ride, he opens only the Auto-Stop Switch. In practice, this would be done automatically by means of a ride timing device. With the Auto-Stop Switch in the opened position, the relay is de-energized, thereby removing the short circuit around microswitch 42 and allowing power to the walking mechanism's motor to be interrupted the very next time the cam comes around.

The relay system may appear to be unnecessary; and for a single robot it is unnecessary. But when a plurality of robots are operated a startling phenomenon would become evident were it not for the relay system.

Specifically, a given robot that had stopped, would suddenly start up again all by itself. What happens is that the microswitches 42 of all the robots are, in effect, electrically wired in parallel. Even though one or more microswitches may be in the opened position, there is bound to be one that is in the closed position; and this single closed one will enable the current to bypass all the opened microswitches, resulting in renewed walking and closing of another microswitch along the system, and so on. The relay system electrically isolates each robot from its companions, thereby forcing them to obey the "stop" command given by the operator.

Some of the fixed D.C. voltage is carried from the rectifier along wire h down into the railway truck where it is conveyed through microswitches 111, 112 wired as shown so as to make opposite polarity connections with the series field counterbalance motor. The labeling of the microswitches and the other elements of the automatic counterbalance system in FIG. 8 corresponds with FIG. 7 and the recitation given in connection with same, so further discourse on the subject should be unnecessary.

Note that when the Auto-Stop Switch is opened, the ride remains lighted. Should any emergency occur, all power to the ride can be instantly shut off by opening the manually operated Main Power Switch.

I claim:
1. In an amusement ride:
support means including a member provided with upper and lower bearing means each having a horizontal axis to provide pivotal movement in a vertical plane only, said horizontal axes lying in the same vertical plane and vertically spaced apart a given distance;
a rider support secured to a member provided with upper and lower bearing means each having a horizontal axis to provide pivotal movement in a vertical plane only, said horizontal axes lying in the same vertical plane and vertically spaced apart a distance equal to the corresponding spacing of the first mentioned bearing means;
an upper arm member extending between and pivotally connecting together the first and second mentioned upper bearing means, and a lower arm member extending between and pivotally connecting together the first and second mentioned lower bearing means;
counterbalance means including a spring connected between said support means and means movable with one of said arm members, in such arrangement that flexure of the spring tends to drive said rider support upwardly.

2. In combination with claim 1:
said counterbalance means including a reversible electric motor and motor driven means to alternately flex and relieve said spring, said motor driven means being movable in opposite directions in response only to rotation of the motor in opposite directions, the combination including limit switch means to control the direction of rotation of the motor, said limit switch means being responsive to the elevation of said rider support such that spring flexure is decreased when the rider support reaches an upper limit and increased when the rider support reaches a lower limit.

3. An amusement ride comprising:
a longitudinally divided runway providing a riding surface and longitudinally extending parallel guide rails located below said runway on each side of the division in same;
rider support means including a motor and motor driven traction means in frictional contact with said riding surface, said rider support means being positioned on said riding surface longitudinal travel on same;
a single railway truck positioned underneath said rider support and below the runway and secured in free rolling engagement with the guide rails, said railway truck being restricted in construction to a single horizontally disposed structure carrying wheels in engagement with the guide rails, said structure providing the sole support for all rider support connected elements;
said railway truck provided with upper and lower bearing means each having a horizontal axis to provide pivotal movement in a vertical plane only, said horizontal axes lying in the same vertical plane and vertically spaced part a given distance, and perpendicular relative to the division in the runway;
said rider support secured to a member depending through the division in the runway, said member provided with upper and lower bearing means each having a horizontal axis to provide pivotal movement in a vertical plane only, said horizontal axes lying in the same vertical plane and vertically spaced apart a distance equal to the corresponding spacing of the first mentioned bearing means, and perpendicular relative to the division in the runway;
an upper arm member extending between and pivotally connecting together the first and second mentioned upper bearing means, and a lower arm member extending between and pivotally connecting together the first and second mentioned lower bearing means.

4. In combination with claim 3:
counterbalance means including a spring connected between said railway truck and means movable with one of said arm members, in such arrangement that flexure of the spring tends to drive said rider support upwardly.

5. In combination with claim 4:
said counterbalance means including a reversible electric motor and motor driven means to alternately flex and relieve said spring, said motor driven means being movable in opposite directions in response only to rotation of the motor in opposite directions, the combination including limit switch means to control the direction of rotation of the motor, said limit switch means being responsive to the elevation of said rider support such that spring flexure is decreased when the rider support reaches an upper limit and increased when the rider support reaches a lower limit.

6. A foot member for mounting in pivotal balanced dependence on the offset end of a crankshaft, said foot member comprising:
a base member lying in a horizontal plane and having a longitudinal axis;
a post member fixed at its lower end to said base member and extending upwardly therefrom;
a longitudinally extending arm member pivotally connected to the upper end of said post member for movement in a vertical plane only;
said arm member provided with bearing means at its free end for receipt of the offset end of said crankshaft, said bearing means so constructed and arranged that the longitudinal axis of a shaft journaled in it is perpendicular to said vertical plane;
means to physically limit the upward travel of the free end of said arm member preventing movement above a given elevation;

spring means extending between said arm member and a relatively stationary part of the combination, adapted to drive the free end of said arm member to its upward limit;

the combination so constructed and arranged as to hang in pivotal balanced dependence from a shaft inserted in the bearing means, and the altitude of the bearing means above the base member does not exceed the longitudinal dimension of the base member.

7. In a walking mechanism having electric gearmotor driven means to alternately lift, advance, lower and return a pair of foot members:

a rotatable eccentric member adapted to complete one revolution for each complete operation of one of said foot members;

an electrical limit switch positioned adjacent said eccentric member, said switch having an external element that is actuated by the greater radius of said eccentric member such that the switch is electrically opened once during each revolution of the eccentric member;

said electric motor provided with a dual power supply circuit, the first part of which includes said limit switch wired in series with the motor, and the second part of which includes a manually actuated human operator controlled on-off switch wired in series with the motor, the combination being so constructed and arranged that power continues to be supplied to the motor after said on-off switch is in the electrically open condition by means of said first part of the power supply circuit, until said eccentric member actuates the limit switch, the eccentric member being so positioned as to open its part of the circuit at a moment when said foot members are approaching the same elevation.

8. For confining a railway truck to longitudinal movement only and permitting turns of short radius, a wheel assembly comprising:

an upright post member pivotable around a vertical axis;

a first arm member extending forwardly from said post member in a given vertical plane;

a second arm member extending rearwardly from said post member in said vertical plane;

an upper flanged wheel secured to said first arm member and rotatable around a horizontal axis that is perpendicular to said vertical plane;

a lower flanged wheel secured to said second arm member and rotatable around a horizontal axis that is parallel to the horizontal axis of the upper wheel;

said upper and lower wheels having their thrust load bearing flanged surfaces standing in the same vertical plane, and vertically spaced apart such that the radial load bearing surface of the upper wheel at its lowermost point lies spaced apart from the radial load bearing surface of the lowermost wheel at its uppermost point a distance adequate to accommodate between them a rail member in the form of a horizontally disposed blade providing an upper and a lower horizontal riding surface and a vertical edge surface for contact with said flanges;

the combination so constructed and arranged that the lowermost perimeter of the flanged portion of the upper wheel depends below the uppermost perimeter of the flanged portion of the lower wheel.

References Cited

UNITED STATES PATENTS

| | | | |
|---|---|---|---|
| 414,227 | 11/1889 | Leake | 104—194 |
| 1,748,210 | 2/1930 | Custer | 104—63 |
| 1,847,976 | 3/1932 | Oldham | 104—140 |
| 3,085,516 | 4/1963 | Cirami | 104—53 |
| 3,093,372 | 6/1963 | Cirami | 104—53 |
| 3,120,197 | 2/1964 | Cirami | 104—53 |
| 965,768 | 7/1910 | Van Sant | 104—139 |
| 2,510,241 | 6/1950 | Miller | 104—140 |

ARTHUR L. LA POINT, Primary Examiner

R. A. BERTSCH, Assistant Examiner